US008297217B2

(12) United States Patent
Hsu et al.

(10) Patent No.: US 8,297,217 B2

(45) Date of Patent: Oct. 30, 2012

(54) CONTROL BOX

(75) Inventors: Jung-Hui Hsu, Sinjhuang (TW); Cheng-Feng Wu, Zhonghe (TW)

(73) Assignee: Powertech Industrial Co., Ltd., Taipei Hsien (TW)

(*) Notice: Subject to any disclaimer, the term of this patent is extended or adjusted under 35 U.S.C. 154(b) by 393 days.

(21) Appl. No.: 12/588,785

(22) Filed: Oct. 28, 2009

(65) Prior Publication Data

US 2011/0041755 A1 Feb. 24, 2011

(30) Foreign Application Priority Data

Aug. 19, 2009 (CN) .......................... 2009 1 0167052

(51) Int. Cl.
*G01D 11/00* (2006.01)

(52) U.S. Cl. ............................ 116/303; 116/2; 200/339

(58) Field of Classification Search .................. 116/303, 116/333, 334, 279, DIG. 28, 2; 200/308, 200/329–345

See application file for complete search history.

(56) References Cited

U.S. PATENT DOCUMENTS 2,293,698 A * 8/1942 Chaput ......................... 116/303
3,225,156 A * 12/1965 Sahrbacker ................... 200/5 B
3,646,958 A * 3/1972 Braas ............................ 137/553
3,918,391 A * 11/1975 Hadfield et al. .............. 116/279
4,115,673 A * 9/1978 Smith ........................... 200/315
4,117,280 A * 9/1978 Feaster ......................... 200/6 B
4,172,973 A * 10/1979 Sano ............................. 200/315
5,180,023 A * 1/1993 Reimers ....................... 180/19.1
5,584,380 A * 12/1996 Naitou .......................... 200/315
6,674,033 B1 * 1/2004 Wang ............................ 200/334
7,330,558 B2 * 2/2008 Arz et al. ...................... 381/315
2002/0092748 A1 * 7/2002 Su ................................ 200/339

* cited by examiner

*Primary Examiner* — Peter MacChiarolo

*Assistant Examiner* — Tania Courson

(74) *Attorney, Agent, or Firm* — Rosenberg, Klein & Lee

(57) ABSTRACT

A control box includes a shell, a display hole, an active member, an indicating member and an interlinking member. The display hole is formed in the shell. The active member has a turn-on end and a turn-off end and is pivotally connected with the shell so as to seesaw. The indicating member is movably disposed in the shell and has a first identifiable portion and a second identifiable portion. The interlinking member is connected between the active member and the indicating member to drive the indicating member to move. Accordingly, when the active member seesaws under the effect of an external force, the indicating member is driven by the interlinking member to show the first identifiable portion or the second identifiable portion in the display hole.

17 Claims, 2 Drawing Sheets

CONTROL BOX

BACKGROUND OF THE INVENTION

1. Field of the Invention

The present invention relates to a control box, and more particularly to a control box which can indicate power states of a controlled object without electric drive.

2. Description of Related Art

General control box, such as remote controllers with batteries, have power indicating lights (for example, LED lights) and indicate power states of controlled objects based on changes of brightness or color of the power indicating lights.

However, the power indicating lights not only consume much electric energy from the batteries of the remotes controllers, which shortens the service life of the batteries, but also cannot show power states of controlled objects when damaged.

Hence, the inventors of the present invention believe that the shortcomings described above are able to be improved and finally suggest the present invention which is of a reasonable design and is an effective improvement based on deep research and thought.

SUMMARY OF THE INVENTION

A main object of the present invention is to provide a control box. When a turn-on end or a turn-off end of an active member of the control box is pressed to seesaw under the effect of an external force, an indicating member is driven to show a first identifiable portion and a second identifiable portion in a display hole by an interlinking member, thereby indicating the current power state of a controlled object via the identifiable portion appearing in the display hole.

To achieve the above-mentioned object, a control box in accordance with the present invention is provided. The control box includes: a shell; a display hole, formed in the shell; an active member, having a turn-on end and a turn-off end and pivotally connected with the shell, wherein the pivoted portion between the active member and the shell is between the turn-on end and the turn-off end so that the active member can seesaw; a indicating member, movably disposed in the shell and having a first identifiable portion and a second identifiable portion; and an interlinking member, connected between the active member and the indicating member to drive the indicating member to move; wherein when the active member seesaws under the effect of an external force, the indicating member is driven by the interlinking member to show the first identifiable portion or the second identifiable portion in the display hole.

The efficacy of the present invention is as follows: the control box of the present invention can achieve the efficacy of indicating the power states basing on the mechanical structure, without electricity, so that users can learn the current power state of the controlled object from the identifiable portion appearing in the display hole, and the service life of batteries of the control box can be prolonged.

To further understand technologies, methods and efficacy of the present invention, please refer to the following detailed description and drawings related the present invention, and it is believed that the objects, characteristics and features of the present invention can be further understood. However, the drawings are only to be used as references and explanations, not to limit the present invention.

DETAILED DESCRIPTION OF THE PREFERRED EMBODIMENTS

Figure 1:
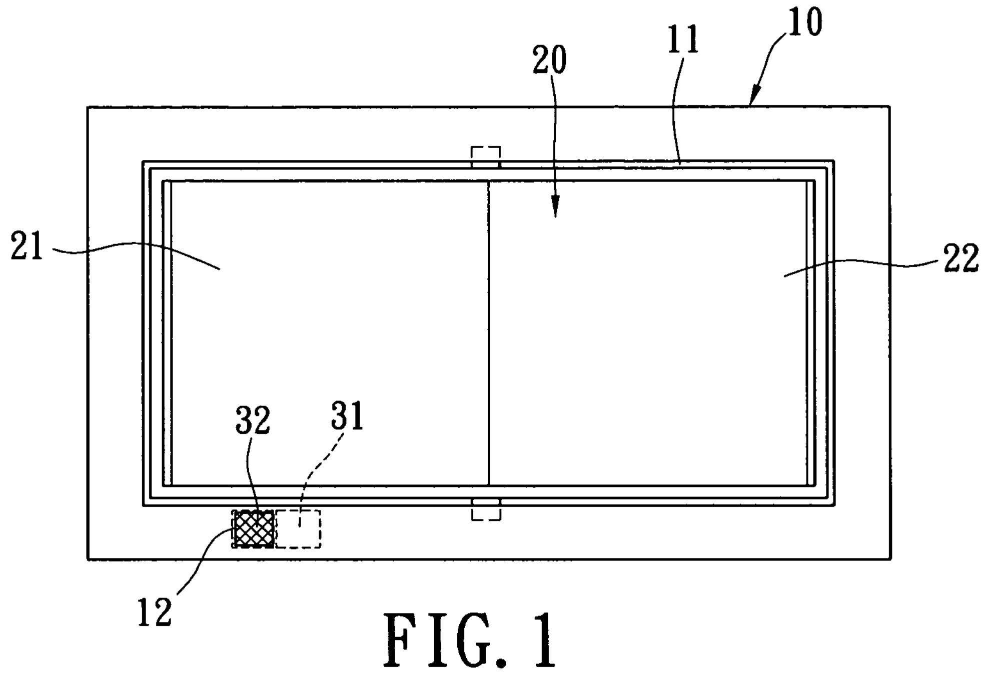
FIG. 1 is a top view of a control box of the present invention.
Figure 2:
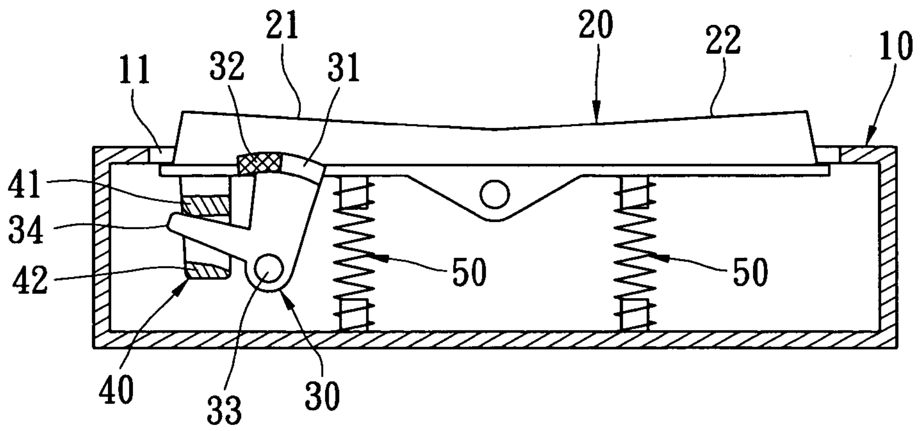
FIG. 2 is a first side view of the control box of the present invention.

Please refer to FIG. 1 and FIG. 2 illustrating a control box. The control box may be, but no limited in, a remote controller with a function of turning on or turning off a controlled object. The control box includes a shell 10, a display hole 12, an active member 20, an indicating member 30, an interlinking member 40, and two elastic members 50. The shell 10 has an opening 11 connected with the inside of the shell 10. The display hole 12 is located in one side of the opening 11.

In the embodiment, the active member 20 is, but not limited in, a two-direction press button. The active member 20 has a turn-on end 21 and a turn-off end 22 for being pressed by users. The active member 20 is received in the opening 11 and pivotally connected with the shell 10. The pivoted portion between the active member 20 and the shell 10 is between the turn-on end 21 and the turn-off end 22 so that the turn-on end 21 and the turn-off end 22 of the active member 20 can seesaw, like two ends of a seesaw.

Figure 3:
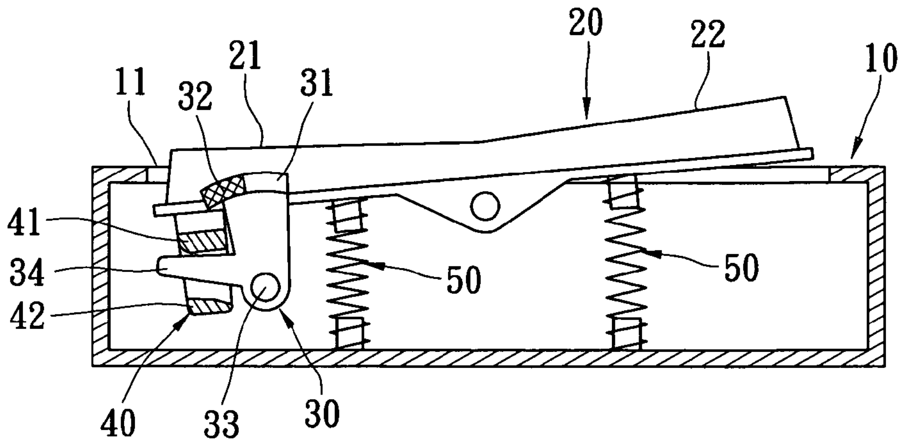
FIG. 3 is a second side view of the control box of the present invention.
Figure 5:
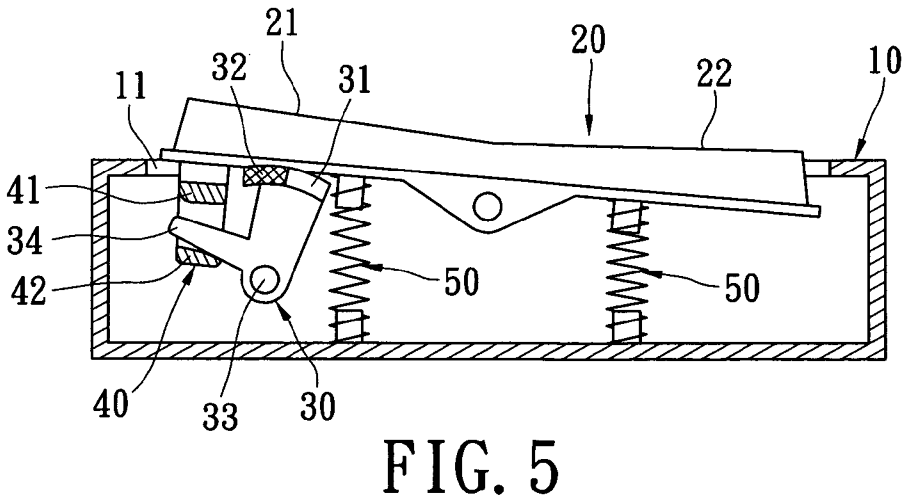
FIG. 5 is a fourth side view of the control box of the present invention.

The indicating member 30 is movably disposed in the shell 10 and moves between a first indicating position (as shown in FIG. 3) and a second indicating position (as shown in FIG. 5). The indicating member 30 has a first identifiable portion 31 and a second identifiable portion 32, corresponding to the display hole 12 of the shell 10. The first identifiable portion 31 and the second identifiable portion 32 have different color for respectively representing different power states, for example, the green color represents the "ON" state and the red color represents the "OFF" state. In the embodiment, when the indicating member 30 is in the first indicating position, the first identifiable portion 31 appears in the display hole 12 of the shell 10, and when the indicating member 30 is in the second indicating position, the second identifiable portion 32 appears in the display hole 12 of the shell 10.

The interlinking member 40 is connected between the active member 20 and the indicating member 30 to drive the indicating member 30 to move.

The two elastic members 50 are respectively disposed on the sides of the turn-on end 21 and the turn-off end 22 to provide restore forces for the turn-on end 21 and the turn-off end 22. In the embodiment, the two elastic members 50 are springs respectively disposed between the turn-on end 21 and the shell 10 and between the turn-off end 22 and the shell 10, so that the turn-on end 21 and the turn-off end 22 can return to their original positions after an external press force is relieved. Basing on the above components, the control box of the present invention is assembled.

In detail, please refer to FIG. 2, the interlinking member 40 is a board body integrally extended downwardly from the active member 20, so whether the turn-on end 21 or the turn-off end 22 are pressed, the board body can move following the active member 20. A first pushing block 41 and a second pushing block 42 protrude from one side of the board body at intervals. Further, the indicating member 30 has a supporting point 33 and a supporting pole 34. The indicating member 30 is pivotally connected with the shell 10 at the supporting point 33 so as to rotate relatively to the shell 10, so the indicating member 30 may move between the first indicating position (as shown in FIG. 3) and the second indicating position (as shown in FIG. 5). The supporting pole 34 is located between the first pushing block 41 and the second pushing block 42 of the interlinking member 40.

Additionally, the movement mode of the indicating member 30 isn't limited in the above mode of rotating relatively to the supporting point 33, for example, the indicating member 30 may move basing on pulling of a pulling rod, or alternatively, magnetic adsorption of a magnetic member (not shown).

During use, please refer to FIG. 3 and FIG. 1, when users press the turn-on end 21 of the active member 20 downwardly, the first pushing block 41 pushes the supporting pole 34 downwardly, so the indicating member 30 rotates counter-clockwise, relatively to the supporting point 33, so that the first identifiable portion 31 moves and appears in the display hole 12, for example, in green, thereby users can learn that the power supply of the controlled object is in the "ON" state.

Figure 4:
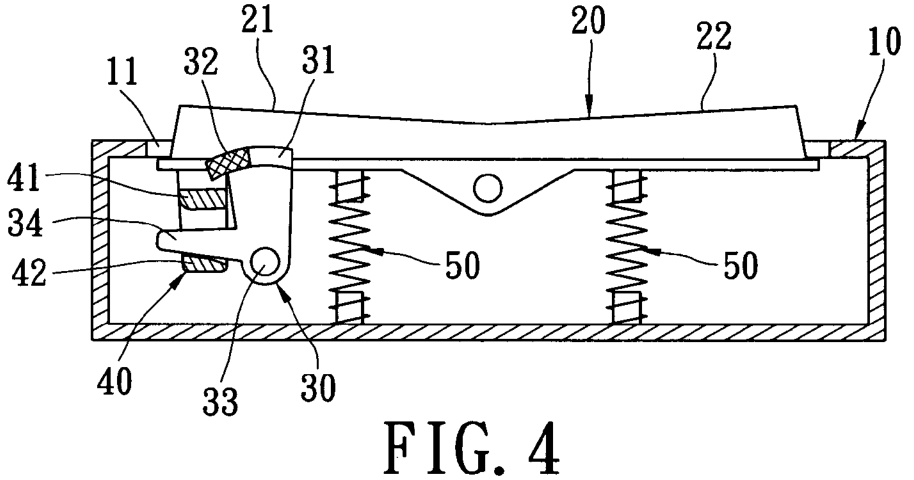
FIG. 4 is a third side view of the control box of the present invention.

Please refer to FIG. 4 and FIG. 1, after users relieve the turn-on end 21 of the active member 20, the turn-on end 21 moves upwardly back to its original position under the effect of the restore force from the elastic member 50 below the turn-on end 21 so that the active member 20 returns to the horizontal state. At this time, the first pushing block 41 moves upwardly and is apart from the supporting pole 34. Since the distance between the first pushing block 41 and the second pushing block 42 is greater than that between an upper dead center and a lower dead center where the supporting pole 34 moves, the second pushing block 42 cannot push the supporting pole 34 to move the indicating member 30 after the second pushing block 42 returns to its original position. So the first identifiable portion 31 still keeps on appearing in the display hole 12 to indicate that the controlled object is in the "ON" state.

Please refer to FIG. 5 and FIG. 1, when users press the turn-off end 22 of the active member 20 downwardly, the second pushing block 42 pushes the supporting pole 34 upwardly, so the indicating member 30 rotates clockwise, relatively to the supporting point 33, and the second identifiable portion 32 moves and appears in the display hole 12, for example, in red, thereby users can learn that the power supply of the controlled object is in the "OFF" state.

Please refer to FIG. 2 and FIG. 1, after users relieve the turn-off end 22 of the active member 20, the turn-off end 22 moves upwardly back to its original position under the effect of the restore force from the elastic member 50 below the turn-off end 22 so that the active member 20 returns to the horizontal state. At this time, the second pushing block 42 moves downwardly and is apart from the supporting pole 34. Likewise, the first pushing block 41 cannot push the supporting pole 34 to move the indicating member 30 after the first pushing block 41 returns to its original position. So the second identifiable portion 32 still keeps on appearing in the display hole 12 to indicate that the controlled object is in the "OFF" state.

Accordingly, the control box of the present invention can achieve the efficacy of indicating the power states basing on the mechanical structure, without electricity, so that users can learn the current power state of the controlled object from the identifiable portion appearing in the display hole, and the service life of batteries of the control box can be prolonged.

What are disclosed above are only the specification and the drawings of the preferred embodiment of the present invention and it is therefore not intended that the present invention be limited to the particular embodiment disclosed. It will be understood by those skilled in the art that various equivalent changes may be made depending on the specification and the drawings of the present invention without departing from the scope of the present invention.

What is claimed is:

1. A control box, comprising:

a shell;

a display hole formed in the shell;

an active member having a turn-on end and a turn-off end and pivotally connected with the shell, wherein the pivoted portion between the active member and the shell is arranged between the turn-on end and the turn-off end so that the active member can seesaw;

an indicating member movably disposed in the shell and having a first identifiable portion and a second identifiable portion; and an interlinking member connected between the active member and the indicating member to drive the indicating member to move;

wherein the interlinking member is a board body integrally extended from the active member;

wherein a first pushing block and a second pushing block protrude from one side of the board body at intervals;

wherein the indicating member has a supporting pole located between the first pushing block and the second pushing block; and wherein when the active member seesaws under the effect of an external force, the indicating member is driven by the interlinking member to show the first identifiable portion or the second identifiable portion in the display hole.

2. The control box as claimed in claim 1, wherein the distance between the first pushing block and the second pushing block is greater than that between an upper dead center and a lower dead center where the supporting pole moves.

3. The control box as claimed in claim 2, wherein the indicating member has a supporting point at which the indicating member is pivotally connected with the shell.

4. The control box as claimed in claim 1, further comprising two elastic members which are respectively disposed on sides of the turn-on end and the turn-off end to provide restore forces for the turn-on end and the turn-off end.

5. The control box as claimed in claim 4, wherein the distance between the first pushing block and the second pushing block is greater than that between an upper dead center and a lower dead center where the supporting pole moves.

6. The control box as claimed in claim 5, wherein the indicating member has a supporting point at which the indicating member is pivotally connected with the shell.

7. The control box as claimed in claim 4, wherein the elastic members are springs.

8. The control box as claim in claim 1, wherein the control box is a remote controller.

9. A control box, comprising:

a shell;

a display hole formed in the shell;

an active member having a turn-on end and a turn-off end and pivotally connected with the shell, wherein the pivoted portion between the active member and the shell is between the turn-on end and the turn-off end so that the active member can seesaw;

an indicating member having a first identifiable portion and a second identifiable portion movably and concealedly disposed in the shell and selectively exposable from the display hole; and an interlinking member, connected between the active member and the indicating member to mechanically drive the indicating member to move;

wherein when the active member seesaws under the effect of an external force, the indicating member is mechanically driven by the interlinking member to reveal the first identifiable portion or the second identifiable portion in the display hole without electric power.

10. The control box as claimed in claim 9, wherein the interlinking member is a board body integrally extended from the active member, and a first pushing block and a second pushing block protrude from one side of the board body at intervals; and the indicating member has a supporting pole located between the first pushing block and the second pushing block.

11. The control box as claimed in claim 10, wherein the distance between the first pushing block and the second pushing block is greater than that between an upper dead center and a lower dead center where the supporting pole moves.

12. The control box as claimed in claim 11, wherein the indicating member has a supporting point at which the indicating member is pivotally connected with the shell.

13. The control box as claimed in claim 9, further comprising two elastic members which are respectively disposed on sides of the turn-on end and the turn-off end to provide restore forces for the turn-on end and the turn-off end.

14. The control box as claimed in claim 13, wherein the interlinking member is a board body integrally extended from the active member, and a first pushing block and a second pushing block protrude from one side of the board body at intervals; and the indicating member has a supporting pole located between the first pushing block and the second pushing block.

15. The control box as claimed in claim 14, wherein the distance between the first pushing block and the second pushing block is greater than that between an upper dead center and a lower dead center where the supporting pole moves.

16. The control box as claimed in claim 15, wherein the indicating member has a supporting point at which the indicating member is pivotally connected with the shell.

17. The control box as claimed in claim 13, wherein the elastic members are springs.

* * * * *